UNITED STATES PATENT OFFICE.

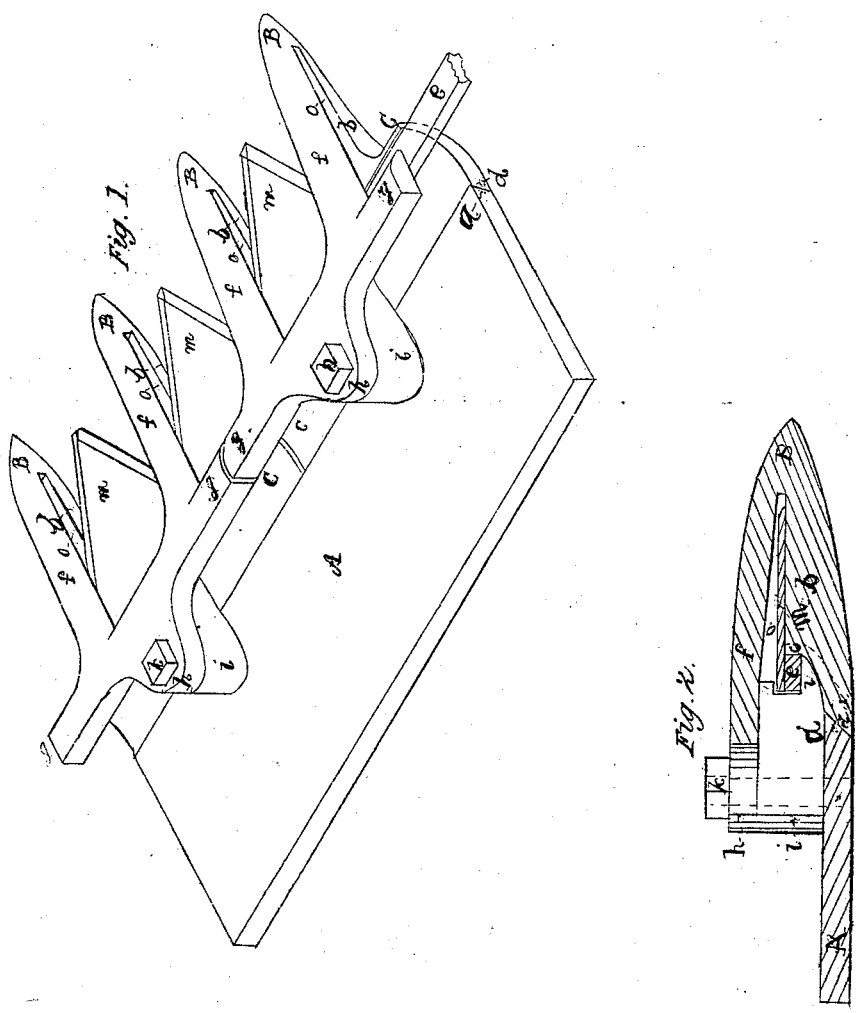

W. A. WOOD, OF HOOSICK FALLS, NEW YORK.

IMPROVEMENT IN THE CUTTING APPARATUS OF HARVESTERS.

Specification forming part of Letters Patent No. 22,468, dated December 28, 1858.

*To all whom it may concern:*

Be it known that I, W. A. WOOD, of Hoosick Falls, in the county of Rensselaer and State of New York, have invented certain new and useful Improvements in the Cutting Apparatus of Harvesters; and I do hereby declare the following to be a full, clear, and exact description of the construction and operation of the same, reference being had to the accompanying drawings, making a part of this specification, in which—

Figure 1 represents in perspective a portion of a cutting apparatus composed of fingers and finger-bar, cutters and cutter-bar. Fig. 2 represents a vertical section taken longitudinally through one of the fingers and finger-bar.

The nature of my invention consists in the manner in which I combine and arrange the finger-bar and guards to afford a support for the cutter-bar and cutters.

To enable others skilled in the art to make and use my invention, I will proceed to describe the same with reference to the drawings.

A represents the finger-bar, which may be a flat plate or bar of iron, with its front edge, $a$, beveled or cut under, as shown in Fig. 2.

The guards B may be cast in sections of two, three, or more guards to the section. The under portion, $b$, of said guards have cast upon their rear portions a shield, $c$, the back edge, $d$, of which is beveled or cut away the reverse of the beveled edge of the finger-bar, and so as to make with it the inclined joint, as shown in Fig. 2. The shields $c$ project both ways horizontally from the guards B, so as to entirely close up the space between said guards, and they rise up far enough to be flush with the top surface of the cutter-bar $e$, thus allowing all the cut material that might otherwise clog the cutter-bar to freely pass over said cutter-bar. The caps $f$ of the guards extend back over the cutter-bar $e$, and have upon them horizontal projections $g$, extending in both directions, so that when the series of sections are arranged on the finger-bar said projections will form an unbroken line throughout the length of the finger-bar, and their front edges between the guards are rounded up to afford an easy passage for the cut material to move backward.

Between the guards of each section there is a lug, $h$, projecting rearward farther than the rear line of the projections $g$, and underneath this lug is cast a block, $i$, that extends down far enough to rest upon the top of the finger-bar A, and through this lug, block, and the finger-bar passes a bolt or rivet, $k$, which, together with the bevel or miter joint for the under fastening, makes a firm and complete union between the guards and the finger-bar. The block $i$ projects forward, as shown in Fig. 2, until it meets the shield $c$, and is there united to the shield. In the front portion of this block a recess is formed that will receive the cutter-bar $e$ and leave its top surface flush with the top surface of the under portion, $b$, of the guard.

$n$ is a cap or projection extending over the rear of the cutters to hold them to their supports.

$m$ are the cutters, and $o$ the slot through the guards, in and through which they vibrate.

This construction and arrangement of guards and cutter-bar leaves no exposed contact-surface where short grass or gummy matter can lodge and accumulate, and frees the cutters from all tendency to become clogged.

Having thus fully described the nature and object of my invention, what I claim therein as new, and desire to secure by Letters Patent, is—

The manner herein described of constructing the guides and uniting them to the finger-bar, as set forth.

W. A. WOOD.

Witnesses:
 LEONARD KING,
 C. E. PETERS.